US012730426B2

(12) United States Patent
Saeki et al.

(10) Patent No.: US 12,730,426 B2
(45) Date of Patent: Sep. 8, 2026

(54) MASTER UNIT

(71) Applicant: FANUC CORPORATION, Minamitsuru-gun (JP)

(72) Inventors: Masahiro Saeki, Minamitsuru-gun (JP); Shinichi Kuwahata, Minamitsuru-gun (JP); Asunaro Maeda, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 378 days.

(21) Appl. No.: 18/282,339

(22) PCT Filed: Mar. 11, 2022

(86) PCT No.: PCT/JP2022/010777
§ 371 (c)(1),
(2) Date: Sep. 15, 2023

(87) PCT Pub. No.: WO2022/202390
PCT Pub. Date: Sep. 29, 2022

(65) Prior Publication Data

US 2024/0152107 A1 May 9, 2024

(30) Foreign Application Priority Data

Mar. 24, 2021 (JP) ................................ 2021-050034

(51) Int. Cl.
*G05B 19/05* (2006.01)

(52) U.S. Cl.
CPC .... *G05B 19/054* (2013.01); *G05B 2219/1105* (2013.01)

(58) Field of Classification Search
CPC .......... G05B 19/054; G05B 2219/1105; G05B 2219/1109; G05B 2219/2231;
(Continued)

(56) References Cited

U.S. PATENT DOCUMENTS 6,609,034 B1 8/2003 Behrens et al.
2015/0039099 A1 2/2015 Mizutani
(Continued)

FOREIGN PATENT DOCUMENTS

CN 110119369 A 8/2019
EP 2 560 061 B1 4/2020
(Continued)

OTHER PUBLICATIONS

International Search Report of PCT/JP2022/010777 dated May 17, 2022 [PCT/ISA/210].
(Continued)

*Primary Examiner* — Christopher W Carter
(74) *Attorney, Agent, or Firm* — Sughrue Mion, PLLC

(57) ABSTRACT

A master unit that transmits a signal with a device via an I/O unit comprises: a connector module having a first connector and a power source unit; and a signal processing module having a branch terminal and a master processing circuit. The connector module and the signal processing module further comprise connection terminal units that connect the first connector and the power source unit with the master processing circuit.

2 Claims, 2 Drawing Sheets

(58) Field of Classification Search
CPC .......... G05B 19/052; G05B 2219/1215; H05K 7/1465; H05K 7/1484
See application file for complete search history.

(56) References Cited

U.S. PATENT DOCUMENTS

| | | | |
|---|---|---|---|
| 2019/0278733 | A1 | 9/2019 | Kessler et al. |
| 2020/0057423 | A1 | 2/2020 | Babasaki et al. |
| 2020/0401547 | A1* | 12/2020 | Kawabe ................ G06F 1/3268 |
| 2021/0065650 | A1 | 3/2021 | Nien et al. |
| 2022/0113787 | A1* | 4/2022 | Tsai .......................... G06F 1/26 |

FOREIGN PATENT DOCUMENTS

| | | | |
|---|---|---|---|
| JP | 9-247766 | A | 9/1997 |
| JP | 10187309 | A | 7/1998 |
| JP | 2002-091519 | A | 3/2002 |
| JP | 2011-130307 | A | 6/2011 |
| JP | 2016-110460 | A | 6/2016 |
| JP | 2018-157456 | A | 10/2018 |
| JP | 2019-114085 | A | 7/2019 |
| JP | 2021-002172 | A | 1/2021 |
| KR | 1020180041006 | A | 4/2018 |
| KR | 102214702 | B1 | 2/2021 |
| TW | M353410 | U1 | 3/2009 |
| TW | 202110169 | A | 3/2021 |
| WO | 2020135912 | A1 | 2/2020 |

OTHER PUBLICATIONS

Extended European Search Report issued Mar. 10, 2025 in Application No. 22775182.3.

Communication dated Dec. 10, 2025 issued by the United States Patent and Trademark Office in U.S. Appl. No. 18/282,250.

Communication dated Dec. 26, 2025 issued by the State Intellectual Property Office of the P.R.China in application No. 202280021768.X.

* cited by examiner 100
102
La
106a (106)
106b (106)
108a (108)
108b (108)
104a (104)
104b (104)
110
112
114
116
118
120
16
18
20
22
24
Lb1
Lb2

FIG. 2

MASTER UNIT

CROSS REFERENCE TO RELATED APPLICATIONS

This application is a National Stage of International Application No. PCT/JP2022/010777 filed on Mar. 11, 2022, claiming priority based on Japanese Patent Application No. 2021-050034 filed on Mar. 24, 2021, which are incorporated herein in their entirety.

TECHNICAL FIELD

The present invention relates to a master unit for transmitting signals to a device via an I/O unit.

BACKGROUND ART

JP 2016-110460 A discloses a programmable logic controller system. The programmable logic controller system includes a base unit serving as a master, a plurality of expansion units (electronic devices) serving as slaves, and a controlled device. The base unit transmits and receives signals to and from the controlled device via the extension unit. The plurality of expansion units are consecutively connected, with the master unit being at the head. The controlled device is, for example, a device such as a sensor or an actuator.

SUMMARY OF THE INVENTION

The master unit is also referred to as a communication coupler unit (or simply a coupler). A typical communication coupler unit includes a master processing circuit, connectors (two connectors), and a power supply unit. The master processing circuit is a circuit that performs signal processing with respect to communication with the slave unit. The two connectors include a connector for preceding-stage connection and a connector for subsequent-stage connection. The connector for preceding-stage connection can be connected to a control device that controls the communication coupler unit or another communication coupler unit. The connector for subsequent-stage connection can be connected to another communication coupler unit. Therefore, it is possible to daisy-chain connect a plurality of communication coupler units together.

Of the components as described above, the design of at least the master processing circuit varies depending on the application or purpose. For example, the optimum configuration of the master processing circuit differs for each type of industrial network. In addition, the configuration of the master processing circuit differs depending on, for example, safety/non-safety (with/without redundancy). An operator can properly use master units equipped with optimum master processing circuits, according to his/her purpose.

In contrast to the master processing circuit which is selectively used depending on the application or purpose, there is a strong tendency that the design of portions, of the communication coupler unit, other than the master processing circuit are standardized. For example, the connector described above can be used regardless of the type of industrial network or regardless of the presence or absence of redundancy. The power supply unit can also be used regardless of the type of industrial network or regardless of the presence or absence of redundancy. However, there is be a case where the specifications of portions other than the master processing circuit may be changed. Here, in a case where the plurality of communication coupler units have a common configuration with respect to portions other than the master processing circuit, the plurality of master units are subject to the specification change all at once. Moreover, in a general master unit (communication coupler unit), there is a case where the connector, the power supply unit, and the master processing circuit may be modularized. In other words, the master processing circuit is often integrated with the connector and the power supply unit. In this case, it is not easy for the operator to change the specification while leaving the master processing circuit unchanged.

The present invention has the object of solving the aforementioned problems.

According to an aspect of the present invention, there is provided a master unit connected to an I/O unit to which a device is connected, the master unit being configured to transmit a signal to the device through the I/O unit, the master unit including: a first connector configured to be connected to a control device or another master unit; a branch-line terminal configured to be connected to the I/O unit provided in a subsequent stage of the master unit; a master processing circuit connected to the first connector and the branch-line terminal; and a power supply unit configured to supply electric power to the master processing circuit, wherein the master unit includes: a connector module including the first connector and the power supply unit; and a signal processing module that is a module separated from the connector module and that includes the branch-line terminal and the master processing circuit, and each of the connector module and the signal processing module is provided with a connection terminal unit configured to connect the first connector and the power supply unit to the master processing circuit.

According to the aspect of the present invention, it is possible to provide a master unit in which a connector and a power supply unit can be easily changed.

BRIEF DESCRIPTION OF DRAWINGS

FIG. 2 is a diagram showing a communication coupler unit according to an embodiment of the present invention.

DETAILED DESCRIPTION OF THE INVENTION

Figure 1:
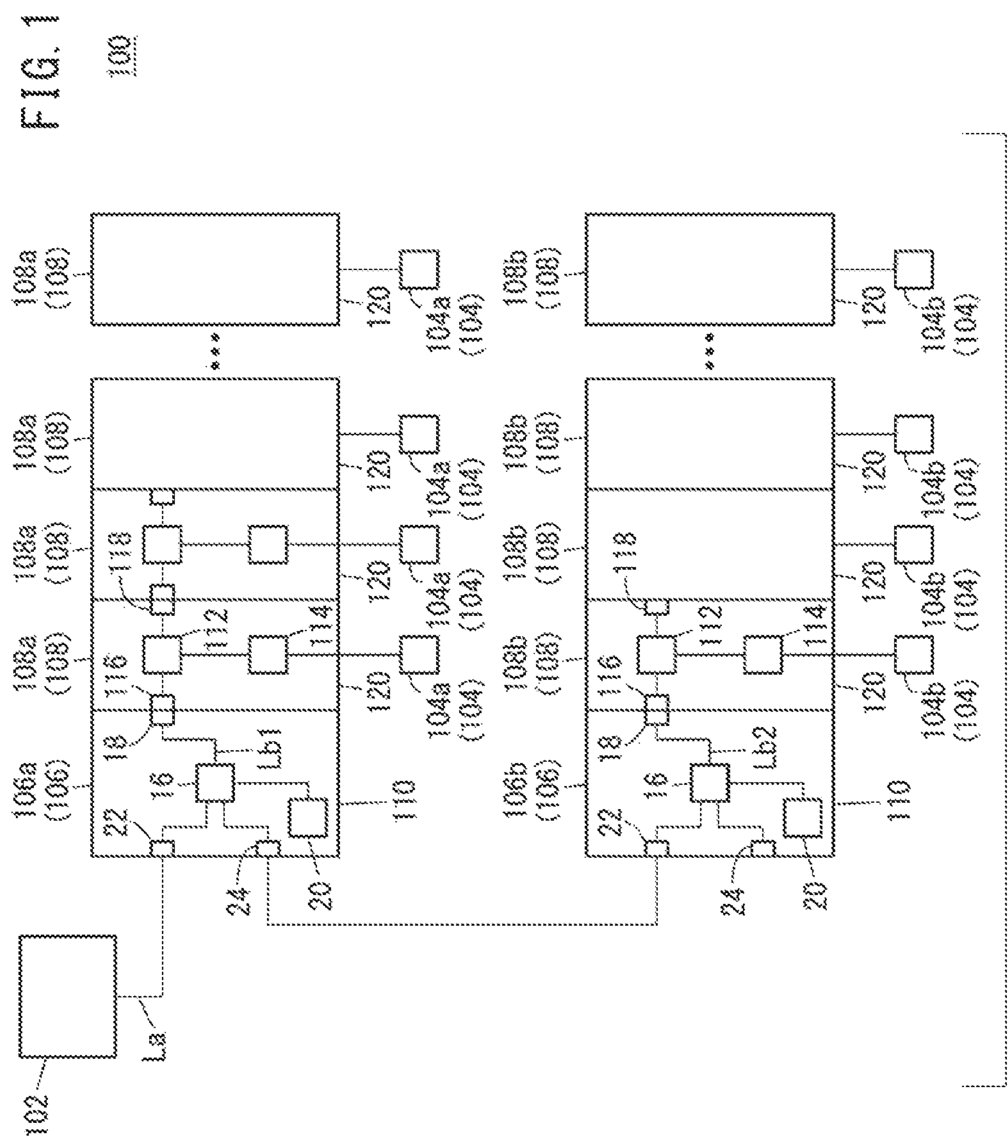
FIG. 1 is a diagram illustrating a communication system according to a reference example of the present invention.

Preferred embodiments of a master unit according to the present invention will be described in detail below with reference to the accompanying drawings.

Embodiments

FIG. 1 is a diagram illustrating a communication system 100 according to a reference example of the present invention.

The communication system 100 is a system that transmits signals between a control device 102 and a device 104. The device 104 is provided in a mechanical apparatus. The mechanical apparatus is, for example, a machine tool or a robot. The device 104 includes an output device **104*a* and an input device 104*b*. The output device 104*a* is, for example, an actuator such as a switch. When driving the output device 104*a*, the control device 102 sends a control signal to the output device 104*a* via the communication system 100. The input device 104*b* is, for example, a sensor that detects pressure, voltage, current, or the like. The control device 102 acquires a detection signal from the input device 104***b*, via the communication system 100.

The communication system 100 includes a plurality of communication coupler units 106 (106*a*, 106*b*) and a plurality of I/O units 108. The I/O units 108 include a plurality of I/O units 108*a* and a plurality of I/O units 108*b*. The plurality of I/O units 108*a* are sequentially connected in the subsequent stage of the communication coupler unit 106*a*. That is, the communication coupler unit 106*a* is a master unit for the plurality of I/O units 108*a*, and each of the plurality of I/O units 108*a* is a slave unit of the communication coupler unit 106*a*. The plurality of I/O units 108*b* are sequentially connected in the subsequent stage of the communication coupler unit 106*b*. That is, the communication coupler unit 106*b* is a master unit for the plurality of I/O units 108*b*, and each of the plurality of I/O units 108*b* is a slave unit of the communication coupler unit 106*b*.

Each of the plurality of communication coupler units 106 includes a master processing circuit 16, a branch-line terminal 18, a power supply unit 20, a first connector 22, a second connector 24, and a housing 110. The housing 110 accommodates the master processing circuit 16, the branch-line terminal 18, the power supply unit 20, the first connector 22, and the second connector 24.

The master processing circuit 16 includes, for example, a central processing unit (CPU). However, the master processing circuit 16 may include an application specific integrated circuit (ASIC), a programmable logic device (PLD), a field programmable logic gate array (FPGA), or the like.

The power supply unit 20 supplies electric power to the master processing circuit 16. However, the power supply unit 20 may supply electric power to the plurality of I/O units 108.

Each of the first connector 22 and the second connector 24 is a connector for connection to the control device 102 or another communication coupler unit 106. In one communication coupler unit 106, the first connector 22 and the second connector 24 are connected to the master processing circuit 16.

The first connector 22 of the communication coupler unit 106*a* is connected to the control device 102. The second connector 24 of the communication coupler unit 106*a* is connected to the first connector 22 of the communication coupler unit 106*b*. Thus, the main line La shown in FIG. 1 is formed. The main line La extends from the control device 102, and then passes through the master processing circuit 16 of the communication coupler unit 106*a* and the master processing circuit 16 of the communication coupler unit 106*b* in this order.

The branch-line terminal 18 is a terminal for connection to the I/O unit 108. The branch-line terminal 18 is connected to the master processing circuit 16.

Each of the plurality of I/O units 108 includes a slave processing circuit 112, an interface 114, a preceding-stage branch-line terminal 116, a subsequent-stage branch-line terminal 118, and a housing 120. The housing 120 accommodates the slave processing circuit 112, the interface 114, the preceding-stage branch-line terminal 116, and the subsequent-stage branch-line terminal 118.

The slave processing circuit 112 includes, for example, a central processing unit (CPU). However, the slave processing circuit 112 may include an application specific integrated circuit (ASIC), a programmable logic device (PLD), a field programmable logic gate array (FPGA), or the like. The slave processing circuit 112 performs input/output of signals with respect to the master processing circuit 16.

The interface 114 is hardware (a circuit or an electronic component group) that connects the slave processing circuit 112 and the device 104. The slave processing circuit 112 and the device 104 perform input and output of signals to and from each other via the interface 114. The specific configuration of the interface 114 varies depending on the type of the device 104.

The plurality of I/O units 108 are connected to the plurality of devices 104. The plurality of I/O units 108 in FIG. 1 are connected respectively to the different devices 104. However, a plurality of devices 104 may be connected to one I/O unit 108.

The preceding-stage branch-line terminal 116 is a terminal for connection to another unit provided in the preceding stage of the I/O unit 108. The other unit provided in the preceding stage of the I/O unit 108 is, for example, the communication coupler unit 106 or another I/O unit 108. The subsequent-stage branch-line terminal 118 is a terminal for connection to another I/O unit 108 provided in the subsequent stage of the I/O unit 108. In one I/O unit 108, the preceding-stage branch-line terminal 116 and the subsequent-stage branch-line terminal 118 are connected to each other via the slave processing circuit 112.

When the communication coupler unit 106 and the I/O unit 108 are provided in this order, the preceding-stage branch-line terminal 116 of the I/O unit 108 is connected to the branch-line terminal 18 of the communication coupler unit 106. Thus, the slave processing circuit 112 of the I/O unit 108 is connected to the master processing circuit 16 of the communication coupler unit 106 provided in the preceding stage of the I/O unit 108.

The preceding-stage branch-line terminal 116 of the I/O unit 108 may be connected to the subsequent-stage branch-line terminal 118 of another I/O unit 108. As a result, a branch line (Lb1, Lb2) is formed in which the master processing circuit 16 of the communication coupler unit 106 and the slave processing circuits 112 of the plurality of I/O units 108 are sequentially connected.

When the control device 102 transmits a control signal to the device 104, the control device 102 outputs the control signal to the communication coupler unit 106*a* connected to the first stage (first) from the control device 102 itself. The control signal includes address information etc. of the I/O unit 108 to which the device 104 as a transmission target is connected. The master processing circuit 16 of the communication coupler unit 106*a* determines whether the address information included in the control signal indicates any one of the plurality of I/O units 108*a*. When the address information does not indicate any one of the plurality of I/O units 108*a*, the master processing circuit 16 of the communication coupler unit 106*a* outputs the control signal to the master processing circuit 16 of the communication coupler unit 106*b*. When the address information indicates any one of the plurality of I/O units 108*a*, the master processing circuit 16 of the communication coupler unit 106*a* outputs the control signal to the I/O unit 108*a* provided in the subsequent stage of the communication coupler unit 106*a* itself. The slave processing circuit 112 of the I/O unit 108*a* that has received the control signal from the preceding stage determines whether or not the address information included in the received control signal indicates the I/O unit 108*a* itself. When the address information indicates the I/O unit 108*a* itself, the slave processing circuit 112 of the I/O unit 108*a* outputs the control signal to the device 104 connected to the I/O unit 108*a* itself. Thus, the device 104 is caused to operate. On the other hand, when the address information included in the input control signal does not indicate the I/O unit 108*a* itself, the I/O unit 108*a* outputs the control signal to another I/O unit 108*a* provided in the subsequent stage of the I/O unit 108*a* itself. When the address information included in the control signal indicates the I/O unit 108 itself, the I/O unit 108 may output the control signal to another I/O unit 108 provided in the subsequent stage. In addition, when the address information included in the control signal indicates the I/O unit 108 connected to the communication coupler unit 106 itself, the communication coupler unit 106 may output the control signal to the next communication coupler unit 106 provided in the subsequent stage.

There is a case where the device 104 may output a signal to the control device 102. In this case, the signal of the device 104 is input to the slave processing circuit 112 of the I/O unit 108 to which the device 104 is connected. The slave processing circuit 112 transmits a signal input from the device 104 connected to the slave processing circuit 112 itself, to the control device 102. In this case, the slave processing circuit 112 outputs the signal to the I/O unit 108 or the communication coupler unit 106 connected to the preceding stage of the slave processing circuit 112 itself. Here, the slave processing circuit 112 adds the content output by the device 104 and the address information of the I/O unit 108 that has output the signal, to the output signal. The input and output of signals between the communication coupler unit 106 and the I/O unit 108 is a well-known technique and thus further description thereof is omitted.

As described above, the master processing circuit 16 has a plurality of variations. For example, the optimum configuration of the master processing circuit 16 differs for each type of industrial network. The industrial network is for example Ethernet, Profinet or EtherCAT. The configuration of the master processing circuit 16 also differs depending on safety network/non-safety network (with/without redundancy).

On the other hand, the configuration of the first connector 22 tends not to be changed in any of the communication coupler units 106. As an example, there are a first communication coupler unit 106 including a master processing circuit 16 for Profinet, for example, and a second communication coupler unit 106 including a master processing circuit 16 for EtherCAT. In this case, the first connector 22 of the first communication coupler unit 106 and the first connector 22 of the second communication coupler unit 106 are often of the same type. Also regarding the power supply unit 20 and the second connector 24, the second connectors are often of the same type in the plurality of communication coupler units 106.

If it is necessary to change the specification of at least one of the power supply unit 20, the first connector 22, or the second connector 24, in the worst case, all the communication coupler units 106 owned by the operator are subject to the specification change. Moreover, the master processing circuit 16, the power supply unit 20, the first connector 22, and the second connector 24 are configured as an integrated module. Therefore, it is not easy for the operator to disassemble the communication coupler unit 106 or change parts of the communication coupler unit 106.

In light of the above, a communication coupler unit 10 according to the present embodiment will be described below. Components similar to the components described in the reference example are denoted by the same reference numerals, description thereof is omitted, and portions different from the reference example will be mainly described.

Figure 2:
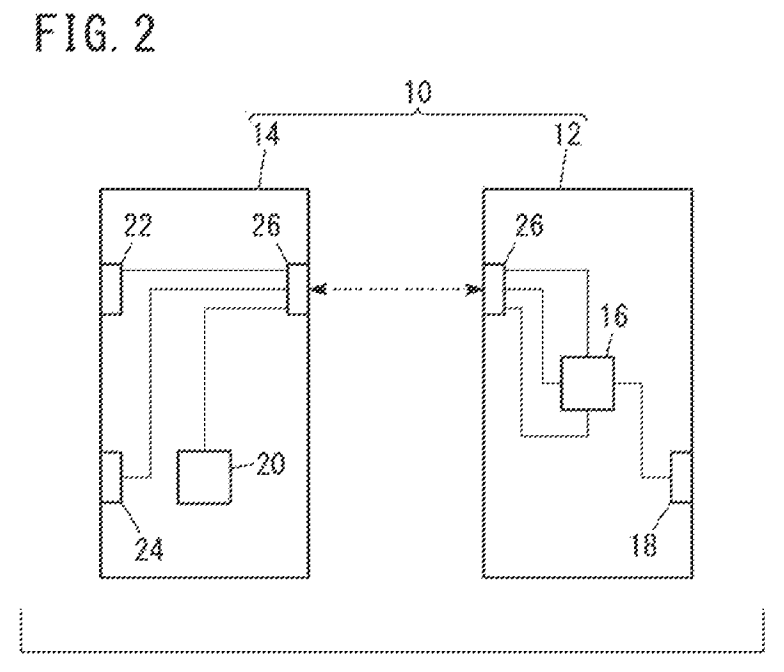

FIG. 2 is a diagram showing a communication coupler unit 10 according to an embodiment of the present invention.

The communication coupler unit (master unit) 10 is made up of a plurality of separable modules. That is, the communication coupler unit 10 includes a signal processing module 12 and a connector module 14. The signal processing module 12 includes a master processing circuit 16 and a branch-line terminal 18. Within the signal processing module 12, the master processing circuit 16 is connected to the branch-line terminal 18. The connector module 14 includes a power supply unit 20, a first connector 22, and a second connector 24.

Each of the signal processing module 12 and the connector module 14 further includes a connection terminal unit 26. The connection terminal unit 26 is a terminal unit (terminal group, connector) for interconnecting the signal processing module 12 and the connector module 14.

The connection terminal unit 26 includes a terminal (terminal group) for the power supply unit 20, a terminal (terminal group) for the first connector 22, and a terminal (terminal group) for the second connector 24. The connection terminal unit 26 of the signal processing module 12 is connected to the master processing circuit 16. On the other hand, the connection terminal unit 26 of the connector module 14 is connected to the power supply unit 20, the first connector 22, and the second connector 24.

The connection terminal unit 26 of the signal processing module 12 and the connection terminal unit 26 of the connector module 14 can be connected to each other. For example, the connection terminal unit 26 of the signal processing module 12 and the connection terminal unit 26 of the connector module 14 are fitted to each other. Thus, the connection terminal unit 26 of the signal processing module 12 and the connection terminal unit 26 of the connector module 14 are connected to each other. The terminals for the power supply unit 20 are connected to each other. The terminals for the first connector 22 are connected to each other. The terminals for the second connector 24 are connected to each other. Accordingly, each of the power supply unit 20, the first connector 22, and the second connector 24 of the connector module 14 is connected to the master processing circuit 16 of the signal processing module 12 through the connection terminal unit 26.

The communication coupler unit 10 can be installed instead of the communication coupler unit 106. In this case, the signal processing module 12 and the connector module 14 are connected to each other. The control device 102 is connected to the first connector 22 of the connector module 14. Another communication coupler unit 10 is connected to the second connector 24. Accordingly, the control device 102, the communication coupler unit 10 (master processing circuit 16), and the other communication coupler unit 10 (master processing circuit 16) are connected to each other. Further, the plurality of I/O units 108 are sequentially connected to the branch-line terminal 18 of the signal processing module 12. Accordingly, the communication coupler unit 10 (the master processing circuit 16) and the plurality of I/O units 108 (the slave processing circuits 112) are connected to each other. The second connector 24 may be in an open state. That is, another communication coupler unit 10 may not be installed at the subsequent stage of the communication coupler unit 10. In this case, the second connector 24 of the communication coupler unit 10 is in an open state. In addition, the other communication coupler unit 10 installed at the subsequent stage of the communication coupler unit 10 may be the communication coupler unit 106.

The signal processing module 12 and the connector module 14 can be easily separated from each other by releasing the connection between the connection terminal units 26. Therefore, when a specification change occurs in the power supply unit 20, the first connector 22, and the second connector 24, the operator can easily achieve the change operation merely by reconnecting a new connector module 14 to the signal processing module 12.

The embodiment has been described above as an example of the present invention. It is noted that various modifications or improvements are capable of being added to the above-described embodiment. Further, it is clear from the scope of the claims that other modes to which such modifications or improvements have been added can be included within the technical scope of the present invention.

For example, if it is not necessary to provide another communication coupler unit 10 at the subsequent stage of the communication coupler unit 10, the second connector 24 itself may be omitted from the connector module 14.

In addition, the signal processing module 12 and the connector module 14 may be provided with an engagement mechanism for fitting the modules to each other. The engagement mechanism includes, for example, a claw and a groove having a shape that allows the claw to be caught. Further, the connection terminal units 26 themselves need not necessarily have a fitting structure as long as they can be electrically connected to each other.

Inventions that can be Obtained from the Embodiment

The invention that can be grasped from the above embodiment is described below.

The master unit (10) is connected to the I/O unit (108) to which the device (104) is connected, and the master unit transmits a signal to the device through the I/O unit. The master unit includes: the first connector (22) configured to be connected to the control device (102) or another master unit (10); the branch-line terminal (18) configured to be connected to the I/O unit provided in the subsequent stage of the master unit; the master processing circuit (16) connected to the first connector and the branch-line terminal; and the power supply unit (20) configured to supply electric power to the master processing circuit, wherein the master unit includes: the connector module (14) including the first connector and the power supply unit; and the signal processing module (12) that is a module separated from the connector module and that includes the branch-line terminal and the master processing circuit, and each of the connector module and the signal processing module is provided with the connection terminal unit (26) that connects the first connector and the power supply unit to the master processing circuit.

With this configuration, the master unit in which the first connector and the power supply unit are easily changed is provided.

The connector module may further include the second connector (24) to which another master unit is connected, and the connection terminal unit may further connect the second connector and the master processing circuit. This makes it possible to connect another master unit to the subsequent stage of the master unit.

The invention claimed is:

1. A master unit connected to an input/output unit to which a device is connected, the master unit being configured to transmit a signal to the device through the input/output unit, the master unit comprising:

a first connector configured to be connected to a control device or another master unit;

a branch-line terminal configured to be connected to the input/output unit provided in a subsequent stage of the master unit;

a master processing circuit connected to the first connector and the branch-line terminal; and a power supply unit configured to supply electric power to the master processing circuit, wherein the master unit includes: a connector module including the first connector and the power supply unit; and a signal processing module that is a module separated from the connector module and that includes the branch-line terminal and the master processing circuit, and each of the connector module and the signal processing module is provided with a connection terminal unit configured to connect the first connector and the power supply unit to the master processing circuit in a separable manner.

2. The master unit according to claim 1, wherein the connector module further includes a second connector to which another master unit is connected, and the connection terminal unit further connects the second connector and the master processing circuit.

* * * * *